United States Patent [19]

Small

[11] Patent Number: 4,608,761
[45] Date of Patent: Sep. 2, 1986

[54] PORTABLE PRECISION GUIDE FOR POWERED HAND TOOLS

[76] Inventor: Charles B. Small, 8804 Citation Dr., Lake Park, Fla. 33410

[21] Appl. No.: 809,383

[22] Filed: Dec. 16, 1985

[51] Int. Cl.⁴ .............................................. B27B 9/04
[52] U.S. Cl. ....................................... 33/471; 30/376; 83/522; 83/745
[58] Field of Search .................. 33/185 R, 465, 466, 33/471; 30/376; 83/455, 522, 743, 745

[56] References Cited

U.S. PATENT DOCUMENTS

| | | | |
|---|---|---|---|
| 2,719,548 | 10/1955 | Mitchell | 33/465 |
| 2,735,455 | 2/1956 | Forsberg | 83/745 |
| 2,823,709 | 2/1958 | Konieczka | 83/745 |
| 3,731,572 | 5/1973 | Crooks | 83/522 |
| 3,742,803 | 7/1973 | Allaire | 83/522 |
| 4,056,028 | 11/1977 | Patterson | 83/745 |
| 4,062,390 | 12/1977 | Beekenkamp | 83/745 |
| 4,335,512 | 6/1982 | Sheps et al. | 83/745 |
| 4,350,066 | 9/1982 | Volk | 83/522 |
| 4,453,438 | 6/1984 | Zelli | 83/745 |

*Primary Examiner*—Richard R. Stearns
*Attorney, Agent, or Firm*—Jack N. McCarthy

[57] ABSTRACT

A portable precision guide for powered hand tools is formed having a base plate with a protractor portion and a table portion, a guide bar on one surface of the base plate guides a powered hand tool on the table portion and an angle arm pivotally mounted on the other surface of the base plate can be positioned by said protractor at a desired angle with said guide bar to position a workpiece for cutting. Said base plate has openings for holding said workpiece therethrough against the angle arm; the workpiece can also be marked where desired through said openings.

12 Claims, 6 Drawing Figures

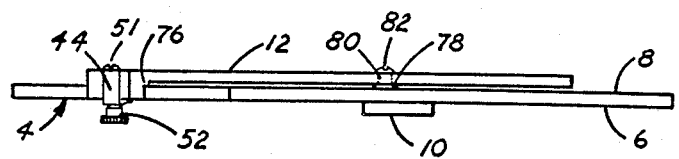
Fig. 2
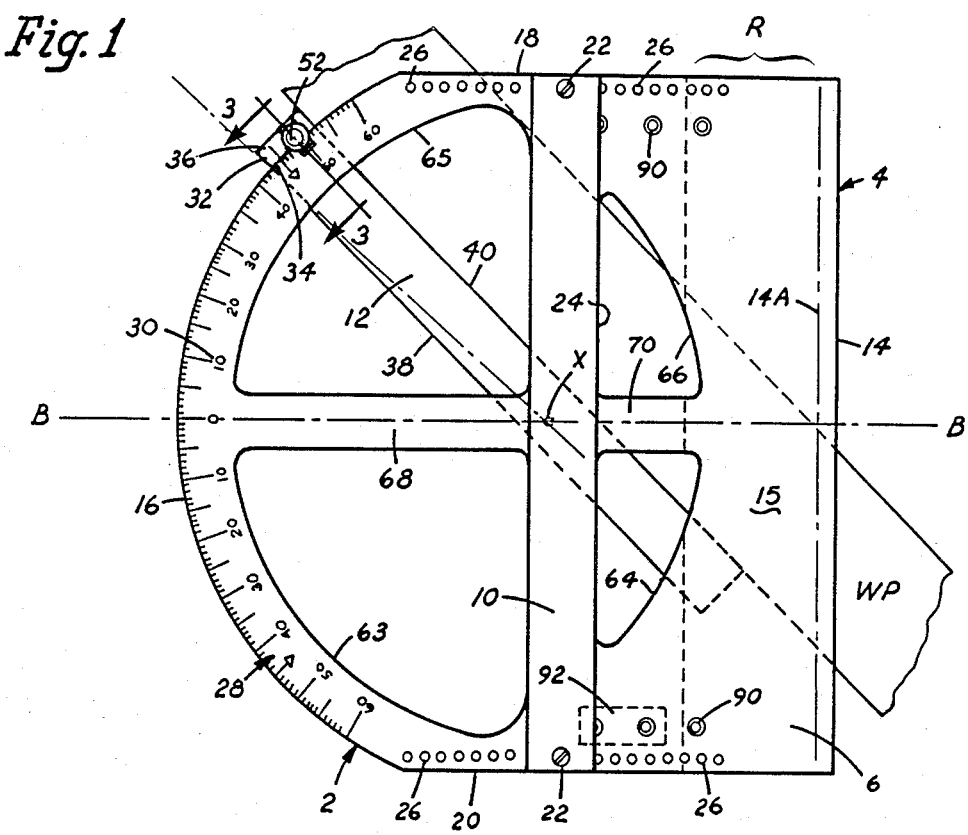
Fig. 1
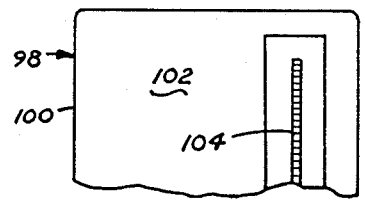

PORTABLE PRECISION GUIDE FOR POWERED HAND TOOLS

TECHNICAL FIELD

This invention relates to portable guides for powered hand tools, such as a circular power saw, router, sabre saw, or the like, used, for example, for cutting moldings and lumber.

BACKGROUND ART

Many portable guides for powered hand tools, such as circular power saws, routers and sabre saws, are known in the prior art; some have been made and some patented. However, to this day the limitations, complexity and cost of many known portable guides leave much to be desired.

Patents setting forth a background for this invention are: U.S. Pat. Nos. 2,735,455; 2,773,523; 3,390,461; 3,739,678; 3,842,700; 3,717,064; 4,014,236; 4,050,340; 4,056,028; 4,075,920; 4,335,512; and 4,494,434.

DISCLOSURE OF INVENTION

An object of the present invention is to provide a portable precision guide for power cutting tools, said tools having an edge which can be guided, such as the edge of a shoe (also known as plate, platform, sole, foot). This portable guide has been made simple in operation; light, sturdy, versatile, and reasonable in cost.

Another object of the present invention is to provide a portable guide having a base plate, said base plate having a protractor portion having angle indicating indicia and a mating table portion, a guide bar on one surface of the base plate for guiding a powered hand tool on said table portion, an angle arm pivotally mounted to the other surface of the base plate for variable positioning thereon, and means to angularly position said angle arm with said angle indicating indicia of said protractor at a desired angle to the guide bar to properly position a workpiece (moldings, etc.) for cutting.

A further object of the present invention is to provide a portable guide whereby the width of the table portion between the guide bar and parallel edge of the table portion of the base plate can be varied by moving the guide bar, cutting off the parallel edge of the table portion, or by doing both. When the width of the table portion of the guide matches the shoe width to the cutting edge of a powered hand tool, the guide is customized to that powered hand tool. This means that the parallel edge of the table portion can be placed on a workpiece and it is this edge that the cutting edge of the tool will follow.

The table portion eliminates marring of the workpiece by the saw shoe. The table portion permits cutting of small moldings and crown moldings without permitting the power saw to rock, as it would if the shoe contacted the molding directly; and the table portion retracts the saw guard, avoiding deflection of the cut which can happen when the saw guard hangs up on the workpiece. This table portion avoids movement of the workpiece caused by downward pressure of the saw shoe since contact is on the table, not the workpiece.

A movable guide bar permits customizing the portable guide with a minimum removal of material from the table thereof. Movement of the guide bar also permits bevel or compound cuts to be made without damaging the table. Recustomizing is provided for, if necessary.

Another object of the present invention is to provide a guide which can be manufactured customized, having the table width matching the shoe width to the cutting edge of a specific make and model of a powered hand tool.

A further object of the present invention is to provide a guide having openings or windows in the base plate to make holding of the workpiece by hand simple and convenient. Openings also expose the angle arm for marking tasks and one task is for marking a line at 90° to the cutting edge of the table portion.

Another object of this invention is to provide a guide having an offset angle arm to add powered hand tool support on the table portion prior to contact between the cutting edge of the hand tool and the workpiece.

A further object of this invention is to provide a detent mechanism for positioning between said angle arm and base plate at desired angular positions before locking. The detent mechanism permits rapid setting to the most commonly used angles.

A further object of this invention is to provide a guide which can have the base plate made level by blocking the base plate with a scrap of the material being cut. For repetitive cuts, the block may be secured to the base plate using the screw holes provided in the base plate.

Another object of this invention is to provide raised pads between the rear surface of the base plate and the mating surface of the angle arm to prevent unnecessary friction therebetween. When the means fixing the angle arm against rotation relative to said base plate is positioned to permit pivotal movement, the detent mechanism acts to separate the angle arm from the base plate, also helping to prevent friction therebetween.

Another object of the invention is to provide indicia for specific tasks, such as roof framing, by utilizing the back of the protractor portion. For instance, the angles required for making the necessary cuts on common, hip, valley and jack rafters, can be marked on the guide to assist carpenters. Coincident with these markings, factors for determining rafter length can also be provided.

Another object of this invention is to provide a tool which is not attached to a saw or table, and thus is available to measure angles and to lay out angular lines on any surface for a variety of purposes.

Another object of the invention is to prevent saw blade binding, burning, dulling, and kickback, by assuring that the powered hand tool is cutting in a straight line.

BRIEF DESCRIPTION OF THE DRAWINGS

FIG. 1 is a top view of the portable precision guide showing the angle arm at 45°, the shoe of a circular power saw aligned with the table surface, and a workpiece in place;

FIG. 2 is a view taken from the top of FIG. 1, omitting the shoe and workpiece;

BEST MODE FOR CARRYING OUT THE INVENTION

Figure 3:
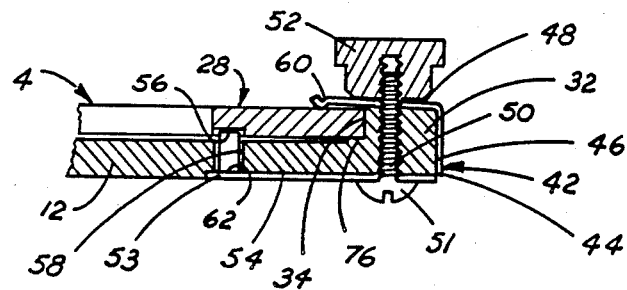
FIG. 3 is a view taken on the line 3—3 showing the means for fixing said angle arm in angular relation to said base plate.

The portable precision guide 2 of FIG. 1 for powered hand tools, for example, a circular power saw, is formed of three main parts: (1) a base plate 4 having a top surface 6 and a bottom surface 8; (2) a guide bar 10 fixedly mounted on the top surface 6 of base plate 4; and (3) an angle arm 12 pivotally mounted on the bottom surface 8 of base plate 4.

As viewed in FIG. 1, base plate 4 is formed as a flat plate having four sides, a right-hand straight edge 14, a left-hand curved edge 16, and two connecting straight edges 18 and 20. Guide bar 10 is fixed to the top surface 6 of base plate 4 by a screw 22 at each end of the guide bar 10. The guide bar 10 has a guide edge 24 for guiding the shoe of a powered hand tool; for example, said guide edge 24 being made parallel to the right-hand straight edge 14 of base plate 4 to form a table surface 15 for supporting the shoe of a powered hand tool. A series of holes 26 extend along the sides of the base plate 4 adjacent to the straight edges 18 and 20 to permit movement of the guide bar 10, left or right, to control the spacing between guide edge 24 and right-hand straight edge 14 to accommodate powered hand tools having shoes of different widths.

Angle arm 12 is pivotally mounted on the bottom surface 8 of base plate 4 on the center line B—B between the two straight edges 18 and 20 at pivot point X. The left-hand curved edge 16 of base plate 4 is formed as an arcuate edge with pivot point X as its center. The left-hand arcuate edge 16 forms a protractor 28 having indicia 30 extending adjacent the arcuate edge from 0° on line B—B to 60° on each side. The left-hand arcuate edge 16 continues past the 60° mark on each side and meets the ends of the straight edges 18 and 20.

Angle arm 12 has a raised pad 32 at its end which has an inner short curved surface 34, extending across its width, which slideably engages the left-hand arcuate edge 16; an indicating line 36 on the top of raised pad 32 lines up with the indicia 30 to indicate the angle that the parallel sides 38 and 40 of angle arm 12 make with guide edge 24 and right-hand straight edge 14; parallel sides 38 and 40 are also parallel to a line through indicating line 36 and pivot point X. The line through indicating line 36 and pivot point X is located nearer the side 38 of angle arm 12, for a purpose to be hereinafter disclosed.

The end of angle arm 12 having raised pad 32 can be fixed relative to the base plate 4 to maintain a desired angular setting between the angle arm 12 and fixed parts, base plate 4, and guide bar 10. An L-shaped clamp 42 has a downwardly extending clamp arm portion 44 positioned in a recess 46 in the end of the raised pad 32, said recess 46 being located nearer the side 40 of angle arm 12 (see FIG. 3). The other clamp arm portion 48 extends inwardly, in line with clamp arm portion 44, over the top of the raised pad 32 and over the top surface of the protractor 28 containing the indicia 30. A bolt 50 having a head 51 extends upwardly through aligned openings in a flat spring 53, raised pad 32, and other clamp arm portion 48, and projects out of the clamp arm portion 48 where a nut 52, having a knurled edge, threadably engages it. The aligned opening through the raised pad 32 is threaded, can be self-threaded, to receive the bolt 50. Tightening of the nut 52 presses the end of clamp arm portion 48 down on the surface of the protractor 28, clamping the angle arm 12 to the base plate 4. The free end of the clamp arm portion 48 has a downwardly extending bend 60 to insure contact with the base plate 4.

Figure 4:
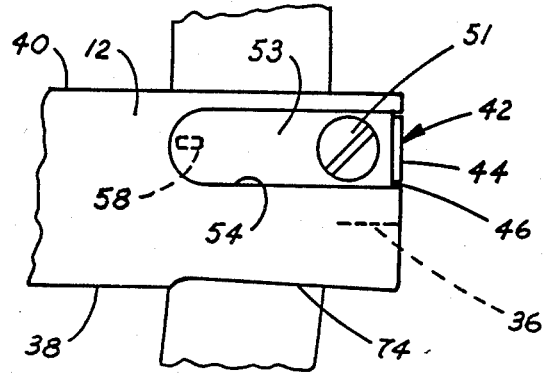
FIG. 4 is a bottom view of FIG. 3.

Flat spring 53 is located in a recess 54 in the bottom of angle arm 12, said flat spring 53 and recess 54 being aligned with arm portion 48 at the same offset distance as recess 46, and provides another function (see FIG. 4). A notch 56 is provided in the underside of the protractor 28 for each desired angle. Since an opening 58 is placed through said angle arm 12 in line with the free end of flat spring 53, a detent member 62, placed in openings 58, is biased against the underside of the protractor 28 by said flat spring 53 which is fixed in position by bolt 50 and its head 51. As the angle arm 12 is rotated about its pivot point X, every time the detent member 62 comes to a notch 56, it will be biased into it by flat spring 53, which action can be felt by the portable precision guide 2 operator. This action indicates the angular position of the angle arm 12 at that known position of the notch 56.

In a portable precision guide 2 that was made, notches 56 were placed in the underside of the protractor 28 to fix the angle arm 12 at 0°, 22.5° and 45° on each side of 0°. In the portable precision guide 2, see FIG. 4, with the opening 58 spaced from the line through indicating line 36 and pivot point X, each notch 56 for a desired angle must be located on the underside of the protractor 28 so that as the detent member 62 aligns itself with a notch 56, indicating line 36 is lined up with the proper desired angle indicia. For example, if it were desired to place the angle arm 12 at 22.5° with respect to guide edge 24 of the guide bar 10, then the notch 56 must be placed at a position spaced from the 22.5° mark, taking into consideration the distance between the opening 58 and a line through indicating line 36 and pivot point X. These angles, 0°, 22.5° and 45°, are used frequently by carpenters working on moldings, trim and cabinetry. If a carpenter is engaged in a woodworking project calling more frequently for other specific angular positions, notches 56 can be placed at positions locating these angles. These new notches 56 can be added to an existing portable precision guide 2, or formed in a custom made guide 2 as the only notches 56.

Openings, or windows, 63, 64, 65 and 66 are provided in the base plate 4 to permit holding or workpiece WP by hand in place against the portable precision guide 2. These openings 63, 64, 65 and 66 also expose the angle arm 12 for marking tasks and provide for better viewing of the contact between the workpiece WP and the sides 38 and 40 of angle arm 12. The aligned center strips 68 and 70, have parallel sides perpendicular to right-hand straight edge 14, which can be used conveniently to mark angles at 90° to straight edge 14.

The bottom surface 8 of said base plate 4 has a rough surface R to engage a workpiece WP to prevent undesirable slipping therebetween. Said roughened surface may take many forms, one being the affixing to the bottom surface 8 of a strip of fine sandpaper or a strip of roughened rubber-like material.

Of the several portable precision guides 2 made for testing, one was constructed of wood, while another was made of a sturdy plastic material. The guide 2 of sturdy plastic material had the base plate 4 formed with a right-hand straight edge 14 of 13 inches (33.02 cm); the two straight edges, 18 and 20, of 8 inches (20.32 cm);

with said left-hand curved edge 16 having a radius of 7 inches (17.78 cm), with the pivot point being located midway between the two straight edges 18 and 20. Sixteen holes 26 were located along the sides of the base plate 4 adjacent to the stright edges 18 and 20 for positioning of the guide bar 10. Guide bar 10 was formed 13 inches (33.02 cm) long and 1¼ inches (3.175 cm) wide. The pivot point X was located offset from the center line of the angle arm 12, being located ⅜ of an inch (0.9525 cm) from side 38 and ⅞ of an inch (2.2225 cm) from side 40.

The outer end of angle arm 12 has the end of side 38 formed as a short angular surface 74 which is formed on a radial line passing through pivot point X (see FIG. 4). This permits short angular surface 74 to be set on indicating lines on the bottom surface of the protractor 28 which places the angle arm 12 in a specific position. Scales can be placed on the bottom of the protractor 28 to convert roof slopes into angles for cutting rafters. Other scales can also be used to aid the carpenter for other specific jobs.

To prevent the bottom surface 8 of base plate 4 from rotating directly against the mating surface of angle arm 12, a small thin pad 76 is placed on the mating surface of angle arm 12 adjacent the raised pad 32. Further, a raised thin pad 78 extends around the projection 80 which extends from base plate 4 into a cooperating opening in angle arm 12. A screw is threaded into the end of projection 80 with the head 82 holding the angle arm 12 in place to provide for relative pivotal movement (see FIG. 2).

To customize a portable precision guide 2 for a particular powered hand tool, the powered hand tool 98 is placed with its guide edge 100 of shoe 102 against the guide edge 24 of guide bar 10 and the shoe 102 is moved along table surface 15 so that the cutting edge 104 cuts through the base plate 4, forming a new right-hand straight edge 14A which is now customized to represent the cutting edge of the powered hand tool. The powered hand tool shown is a circular power saw. The portable precision guide 2 is now customized to match this powered hand tool 98 and the edge 14A (shown in phantom) represents the exact line of cut of this powered hand tool and this cutting edge 14A can be used to position workpieces without the need to draw a line. It is to be remembered that the portable precision guide 2 should be kept level by using a scrap 92, of the material being cut, under the base plate 4. For repetitive cuts, a block may be secured to the base plate 4 by connecting the blocks thereto by screws positioned through screw holes 90. Pre-formed blocks can be used where work involves the use of a large number of the same sized workpieces.

As referred to above, the line through the indicating line 36 and pivot point X is located nearer the side 38 of angle arm 12. This permits the longer distance from pivot point X to the side 40 to position the workpiece WP closer to straight edge 18, thereby adding to the length of the table surface 15 from edge 20 to the workpiece WP. This provides an extra distance for alignment of powertool guide edge 100 with guide edge 24 of guide bar 10 and also permits retraction of the saw guard by the table portion preventing the saw guard from engaging the workpiece.

Beveled cuts can be made by tilting the saw blade. To avoid cutting off the edge 14A of guide 2 by the saw blade, the guide bar 10 is moved toward the edge 14A a distance so cutting contact will not be made with edge 14A. Test cutting a piece of scrap will determine the offset distance of the cutting edge 104 of the powered hand tool 98 from the edge 14A of the portable precision guide 2. Properly marking and positioning the workpiece WP using the offset distance, permits guiding the hand powered tool along guide bar edge 24 of the portable precision guide 2 as usual.

A compound cut can be made by placing the angle arm 12 at the required angle and proceeding as for a bevel cut. A coped joint can be made easily by (1) making a 45° bevel cut; and (2) using a coping saw to cut at right angles along the line of intersection between the molding surface and the 45° face.

Figure 5:
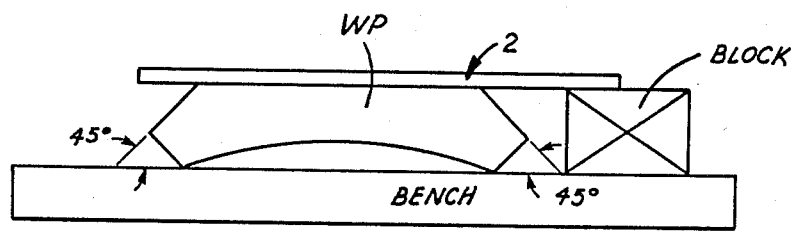
FIG. 5 is a diagrammatic view showing a crown molding supported directly on a flat surface with a portable precision guide thereon parallel to the flat surface, where the crown molding has its ceiling and wall surfaces at 45° to the flat surface.

Crown moldings that can lay on a flat surface with the ceiling and wall faces at 45° to the flat surface, as shown in FIG. 5, can be cut to form a mitered joint as follows: (1) position the crown molding on a flat surface, such as a bench (with the ceiling and wall surfaces 45° thereto); (2) position the angle arm 12 of the portable precision guide 2 at 35¼°; (3) tilt the saw blade at 30°; (4) position guide bar 10 for a compound cut; (5) position the portable precision guide 2 on the crown molding parallel to the bench (blocking may be necessary to support guide 2), with angle arm 12 against said molding, and grip firmly; (6) guide the powered hand tool along guide bar edge 24 on table surface 15 as usual.

Figure 6:
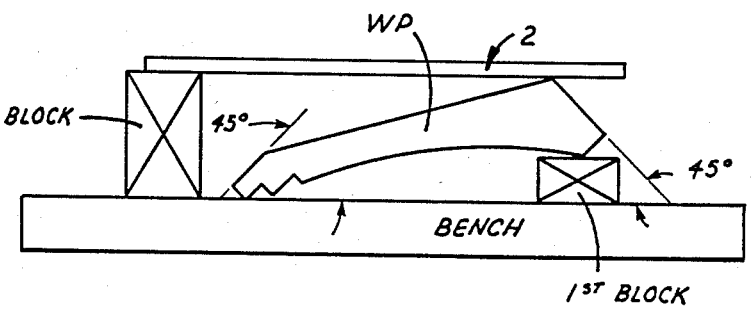
FIG. 6 is a diagrammatic view showing a crown molding where the ceiling and wall surfaces are blocked to be at 45° to the flat surface and the portable precision guide is blocked to be parallel to the flat surface.

Crown moldings whose ceiling and wall faces are not at 45° when laid on a flat surface, require a first blocking, as shown in FIG. 6, to position the ceiling and wall faces at 45° to the flat surface, and a second blocking is required to place the portable precision guide 2 parallel to the flat surface, then the method described above for a crown molding mitered joint is followed.

I claim:

1. A portable precision guide for powered hand tools comprising a base plate having a top surface and a bottom surface, said base plate having a first right-hand straight edge and a first left-hand edge, side edges connecting corresponding ends of said first right-hand straight edge and said first left-hand edge, a guide bar on the top surface of said base plate, said guide bar having a second right-hand straight edge spaced from and parallel to the first right-hand straight edge of said base plate, a table surface being formed on said top surface between the first right-hand straight edge of said base plate and the second right-hand straight edge of said guide bar, a protractor means being formed on said base plate to the right of the first left-hand edge of said base plate, an angle arm, means pivotally mounting said angle arm to the bottom surface of said base plate, said angle arm having a straight edge which can be placed at a plurality of different angles to the first right-hand straight edge of said base plate, said protractor means and angle arm having cooperating indicia and indicating line respectively to indicate the precise angle between the straight edge of said angle arm and the first right-hand straight edge of said base plate, means connecting said angle arm to said base plate to fix said angle arm in relation to said base plate.

2. A portable precision guide as set forth in claim 1 wherein said guide bar has mounting means to vary the width of the table surface between the first right-hand straight edge of said base plate and the second right-hand straight edge of said guide bar.

3. A portable precision guide as set forth in claim 1 wherein said base plate has openings therein, said openings permitting access to a workpiece through said openings for holding a workpiece against the angle arm.

4. A portable precision guide as set forth in claim 3 wherein the openings are separated by a center strip having parallel sides perpendicular to the first right-hand straight edge.

5. A portable precision guide as set forth in claim 1 wherein said means pivotally mounting said angle arm to said base plate has an offset pivot, said angle arm having a second straight edge parallel to its other straight edge, said angle arm having a pivot located nearer to said second straight edge to add to the length of table surface from a side edge to the angle arm.

6. A portable precision guide as set forth in claim 1 wherein the bottom surface of said base plate has a rough surface to engage a workpiece to prevent movement therebetween.

7. A portable precision guide as set forth in claim 1 wherein one side edge of said base plate is positioned to retract a saw guard of a circular power saw before a workpiece is reached.

8. A portable precision guide as set forth in claim 1 including spring means for separating said angle arm and base plate to prevent friction therebetween when the angle arm and base plate are being rotated relative to each other.

9. A portable precision guide as set forth in claim 1 wherein said means pivotally mounting said angle arm to said base plate has a pivot point, said first left-hand edge of said base plate is arcuate in shape having said pivot point as a center, said angle arm having a raised pad projecting upwardly around the first top edge of said base plate and slideably engaging said arcuate edge, said indicating line being located on said raised pad, means clamping said angle arm to said base plate to fix said angle arm in relation to said base plate including an arm means fixed to said raised pad and extending over said base plate to clamp down on it.

10. A portable precision guide as set forth in claim 9 wherein said cooperating indicia of said protractor means is on the top surface of said base plate, said protractor means and angle arm having second cooperating indicia and indicating edge respectively to indicate a desired roof slope, said second cooperating indicia of said protractor means being on the bottom surface of said base plate, the edge of said angle arm cooperating with the second cooperating indicia.

11. A portable precision guide as set forth in claim 10 wherein the edge of said angle arm cooperating with the second cooperating indicia has a short angled section, the extension of which passes through the pivot point.

12. A portable precision guide as set forth in claim 1 wherein the table portion is made from a cuttable material thus permitting partial removal of the table portion to match the table width to the cutting tool to obtain a desired table width.

* * * * *